United States Patent
Pong et al.

(10) Patent No.: US 11,772,265 B2
(45) Date of Patent: Oct. 3, 2023

(54) METHOD, SYSTEM, AND NON-TRANSITORY COMPUTER-READABLE RECORDING MEDIUM FOR CONTROLLING MOVEMENT OF A ROBOT

(71) Applicant: Bear Robotics, Inc., Redwood City, CA (US)

(72) Inventors: Bryant Leo Pong, Hayward, CA (US); Henry A. Leinhos, Palo Alto, CA (US); Sanghun Jung, Seoul (KR)

(73) Assignee: Bear Robotics, Inc., Redwood City, CA (US)

( * ) Notice: Subject to any disclaimer, the term of this patent is extended or adjusted under 35 U.S.C. 154(b) by 180 days.

(21) Appl. No.: 16/998,134

(22) Filed: Aug. 20, 2020

(65) Prior Publication Data

US 2022/0055212 A1    Feb. 24, 2022

(51) Int. Cl.
    B25J 9/16    (2006.01)
(52) U.S. Cl.
    CPC .......... B25J 9/1664 (2013.01); B25J 9/1653 (2013.01)
(58) Field of Classification Search
    CPC ..... B25J 9/1664; B25J 9/1653; G05D 1/0066; G05D 1/0223; G05D 2201/0211
    See application file for complete search history.

(56) References Cited

U.S. PATENT DOCUMENTS

| | | | |
|---|---|---|---|
| 9,266,435 B2* | 2/2016 | Trowell | A61G 5/042 |
| 2015/0039128 A1* | 2/2015 | Oaki | B25J 9/1651 |
| | | | 700/253 |
| 2017/0291315 A1* | 10/2017 | Wise | G05D 1/0055 |
| 2019/0278284 A1* | 9/2019 | Zhang | G05D 1/0223 |
| 2019/0367027 A1* | 12/2019 | Sunil Kumar | B60W 60/001 |
| 2020/0070346 A1* | 3/2020 | Oaki | B25J 9/1664 |
| 2021/0061302 A1* | 3/2021 | Hashizume | B60K 28/08 |

FOREIGN PATENT DOCUMENTS

| | | | |
|---|---|---|---|
| KR | 1020110022953 A | 3/2011 |
| KR | 1020130099672 A | 9/2013 |
| KR | 102049962 B1 | 11/2019 |
| KR | 102062263 B1 | 1/2020 |

* cited by examiner

*Primary Examiner* — Abby Y Lin
*Assistant Examiner* — Dylan Brandon Mooney
(74) *Attorney, Agent, or Firm* — Dinsmore & Shohl LLP; Yongsok Choi, Esq.

(57) ABSTRACT

A method for controlling movement of a robot includes inputting a first linear velocity parameter and a first angular velocity parameter, which are specified as the robot moves, into a first limit model for limiting a centripetal acceleration to correct the first linear velocity parameter and the first angular velocity parameter, thereby calculating a second linear velocity parameter and a second angular velocity parameter, inputting the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter and a third angular velocity parameter, and controlling the movement of the robot based on the third linear velocity parameter and the third angular velocity parameter.

11 Claims, 6 Drawing Sheets

METHOD, SYSTEM, AND NON-TRANSITORY COMPUTER-READABLE RECORDING MEDIUM FOR CONTROLLING MOVEMENT OF A ROBOT

FIELD OF THE INVENTION

The present invention relates to a method, system, and non-transitory computer-readable recording medium for controlling movement of a robot.

BACKGROUND

Robots are utilized to replace or assist people in various fields because they can automatically perform difficult tasks or repetitive operations. Recently, various researches are being conducted on how to control movement of a robot.

As an example of related conventional techniques, Korean Registered Patent Publication No. 10-1240259 discloses a method for controlling a stop of a mobile robot having a stereo camera, characterized in performing the processes of: acquiring an image as the mobile robot follows a target and performing predetermined signal processing on the acquired image; acquiring information on a distance to the target using the image; comparing the distance information with a first stop area to stop or move the mobile robot; varying the first stop area and comparing the distance information with a second stop area; and generating a variable speed profile based on a result of the comparison to stop the mobile robot.

However, according to the techniques introduced so far as well as the above-described conventional technique, the movement of a robot is controlled by individually controlling a linear velocity or angular velocity associated with the movement of the robot or only controlling the linear velocity, and thus unnatural movement or sudden braking often occurs to the robot, which may cause spilling of an object that the robot is conveying or loading (e.g., food) or instability in the overall posture of the robot.

In this connection, the inventor(s) present a novel and inventive technique for naturally and efficiently controlling movement of a robot by serially connecting models for controlling parameters related to the movement of the robot (e.g., a centripetal acceleration, a linear velocity, an angular velocity, etc.) and sequentially applying constraint conditions.

SUMMARY OF THE INVENTION

One object of the present invention is to solve all the above-described problems in the prior art.

Another object of the invention is to control a robot such that the robot may move stably, smoothly, and naturally.

Yet another object of the invention is to minimize the effect (e.g., inertia) on a robot or an object that the robot is transporting or loading (e.g., a cup, a dish, food, or the like).

The representative configurations of the invention to achieve the above objects are described below.

According to one aspect of the invention, there is provided a method for controlling movement of a robot, the method comprising the steps of: (a) inputting a first linear velocity parameter and a first angular velocity parameter, which are specified as the robot moves, into a first limit model for limiting a centripetal acceleration to correct the first linear velocity parameter and the first angular velocity parameter, thereby calculating a second linear velocity parameter and a second angular velocity parameter; (b) inputting the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter and a third angular velocity parameter; and (c) controlling the movement of the robot on the basis of the third linear velocity parameter and the third angular velocity parameter.

According to another aspect of the invention, there is provided a system for controlling movement of a robot, the system comprising: a correction parameter calculation unit configured to input a first linear velocity parameter and a first angular velocity parameter, which are specified as the robot moves, into a first limit model for limiting a centripetal acceleration to correct the first linear velocity parameter and the first angular velocity parameter, thereby calculating a second linear velocity parameter and a second angular velocity parameter, and to input the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter and a third angular velocity parameter; and a robot movement management unit configured to control the movement of the robot on the basis of the third linear velocity parameter and the third angular velocity parameter.

In addition, there are further provided other methods and systems to implement the invention, as well as non-transitory computer-readable recording media having stored thereon computer programs for executing the methods.

According to the invention, it is possible to control a robot such that the robot may move stably, smoothly, and naturally.

According to the invention, it is possible to minimize the effect (e.g., inertia) on a robot or an object that the robot is transporting or loading (e.g., a cup, a dish, food, or the like).

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 1:
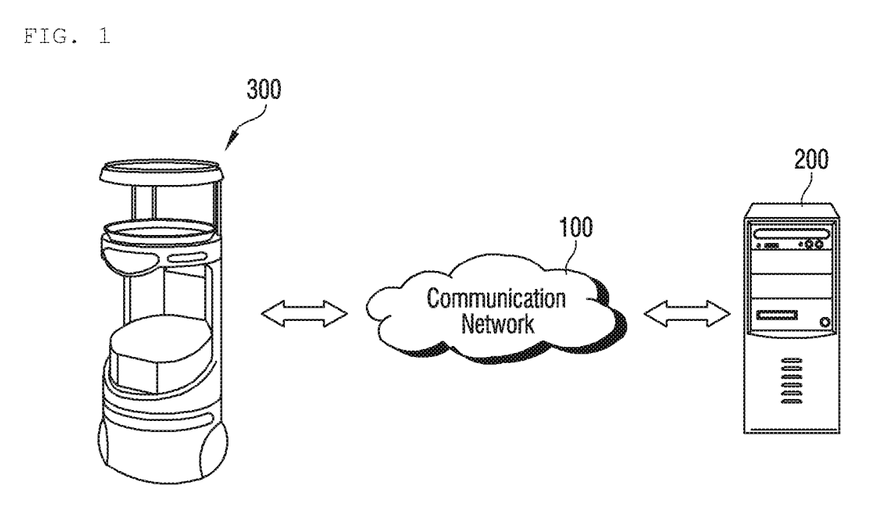
FIG. 1 schematically shows the configuration of an entire system for controlling movement of a robot according to one embodiment of the invention.

FIG. 1 schematically shows the configuration of the entire system for controlling movement of a robot according to one embodiment of the invention.

As shown in FIG. 1, the entire system according to one embodiment of the invention may comprise a communication network 100, a robot movement control system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the robot movement control system 200 according to one embodiment of the invention may communicate with the robot 300 to be described below via the communication network 100, and may function to: input a first linear velocity parameter and a first angular velocity parameter, which are specified as the robot 300 moves, into a first limit model for limiting a centripetal acceleration to correct the first linear velocity parameter and the first angular velocity parameter, thereby calculating a second linear velocity parameter and a second angular velocity parameter; input the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter and a third angular velocity parameter; and control the movement of the robot 300 on the basis of the third linear velocity parameter and the third angular velocity parameter.

Meanwhile, although the robot movement control system 200 has been described as above, the above description is illustrative, and it will be apparent to those skilled in the art that at least a part of the functions or components required for the robot movement control system 200 may be implemented or included in the robot 300 to be described below or an external system (not shown), as necessary. Further, in some cases, all of the functions and components of the robot movement control system 200 may be implemented or included in the robot 300.

Next, the robot 300 according to one embodiment of the invention is a device that may communicate with the robot movement control system 200 via the communication network 100, and may autonomously perform predetermined functions or assigned tasks (e.g., serving food, retrieving containers, etc.) without any operation of a user. The robot 300 may include at least one of a module (e.g., a grab, a robotic arm module, etc.) for loading and unloading an object (e.g., a food tray), an imaging module (e.g., a visible light camera, an infrared camera, etc.) for acquiring images of surroundings, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for controlling the movement of the robot 300. The application may be downloaded from the robot movement control system 200 or an external application distribution server (not shown).

Configuration of the Robot Movement Control System

Hereinafter, the internal configuration of the robot movement control system 200 crucial for implementing the invention and the functions of the respective components thereof will be discussed.

Figure 2:
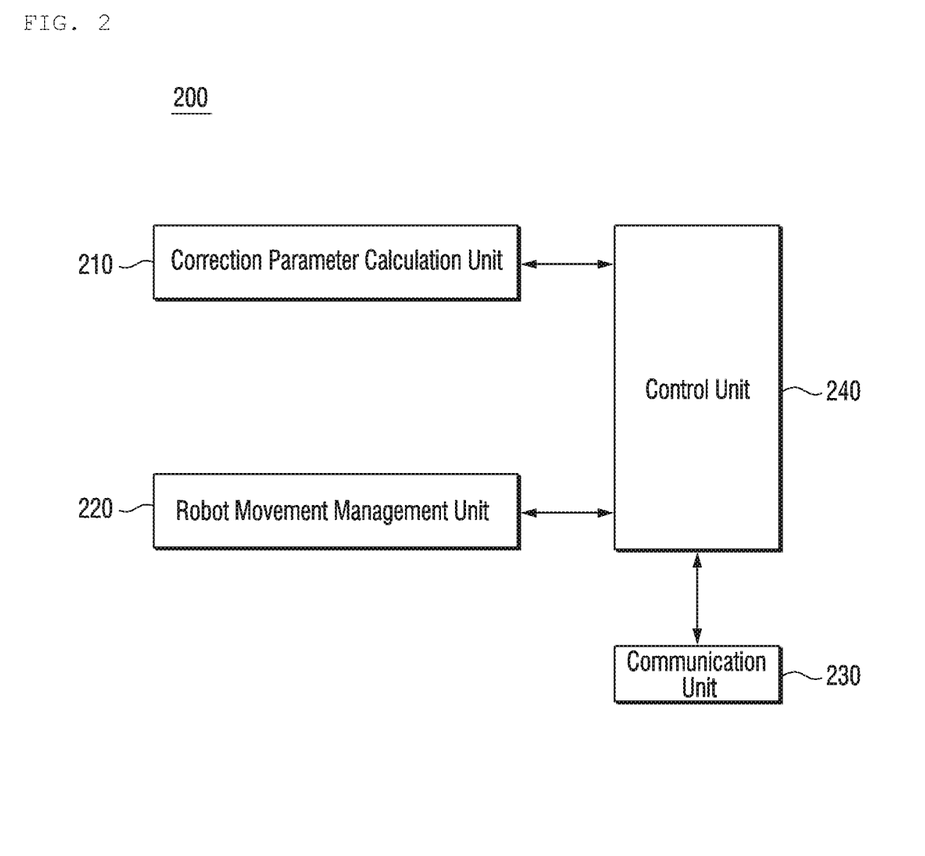
FIG. 2 illustratively shows the internal configuration of a robot movement control system according to one embodiment of the invention.

FIG. 2 illustratively shows the internal configuration of the robot movement control system 200 according to one embodiment of the invention.

As shown in FIG. 2, the robot movement control system 200 according to one embodiment of the invention may comprise a correction parameter calculation unit 210, a robot movement management unit 220, a communication unit 230, and a control unit 240. According to one embodiment of the invention, at least some of the correction parameter calculation unit 210, the robot movement management unit 220, the communication unit 230, and the control unit 240 may be program modules that communicate with an external system. The program modules may be included in the robot movement control system 200 in the form of operating systems, application program modules, and other program modules, while they may be physically stored in a variety of commonly known storage devices. Further, the program modules may also be stored in a remote storage device that may communicate with the robot movement control system 200. Meanwhile, such program modules may include, but are not limited to, routines, subroutines, programs, objects, components, and data structures for performing specific tasks or executing specific abstract data types according to the invention as will be described below.

First, the correction parameter calculation unit 210 according to one embodiment of the invention may input a first linear velocity parameter and a first angular velocity parameter, which are specified as the robot 300 moves, into a first limit model for limiting a centripetal acceleration to correct the first linear velocity parameter and the first angular velocity parameter, thereby calculating a second linear velocity parameter and a second angular velocity parameter. According to one embodiment of the invention, the correction parameter calculation unit 210 may acquire the first linear velocity parameter and the first angular velocity parameter when the robot 300 moves, using a sensor module (e.g., an image detection sensor, an acceleration sensor, a gyroscope sensor, etc.) included in or interworking with the robot 300.

For example, the correction parameter calculation unit 210 may calculate a first centripetal acceleration on the basis of the first linear velocity parameter and the first angular velocity parameter of the robot 300, and may correct the first linear velocity parameter and the first angular velocity parameter, respectively, using a difference calculated by comparing the first centripetal acceleration with a centripetal acceleration limiting criterion specified from the first limit model, thereby calculating the second linear velocity parameter and the second angular velocity parameter. The first limit model according to one embodiment of the invention may allow the centripetal acceleration limiting criterion to be dynamically specified on the basis of a centripetal acceleration, and, for example, may be dynamically determined such that the centripetal acceleration and the limiting criterion thereof have a staircase relationship or proportional relationship (e.g., a relationship corresponding to a staircase graph or proportional graph in which the centripetal acceleration is shown on the horizontal axis and the limiting criterion is shown on the vertical axis).

Figure 3:
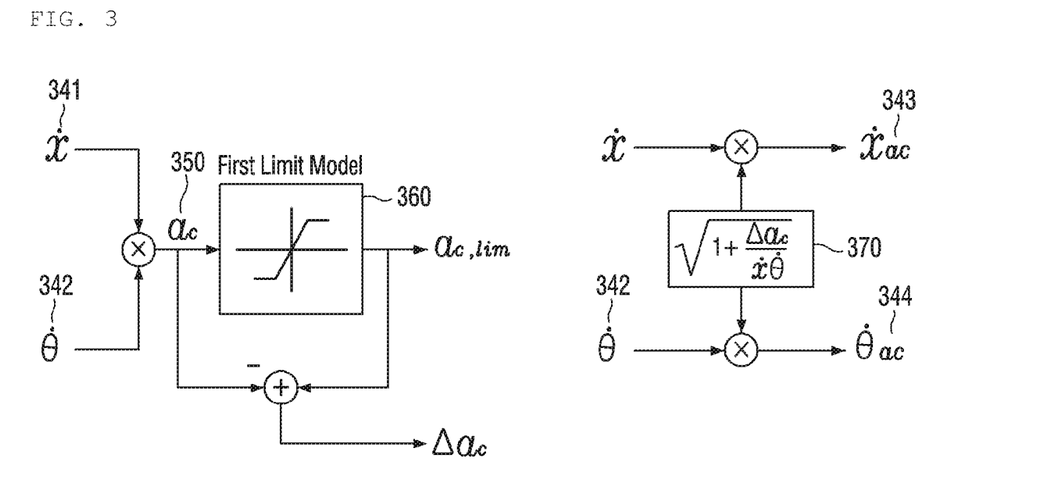
FIG. 3 illustratively shows a process of controlling movement of a robot according to one embodiment of the invention.

More specifically, referring to FIG. 3, the correction parameter calculation unit 210 may compare a first centripetal acceleration 350 calculated on the basis of a first linear velocity parameter 341 and a first angular velocity parameter 342 with a centripetal acceleration limiting criterion specified from a first limit model 360 to calculate a correction value 370 on the basis of a difference between the first centripetal acceleration 350 and the centripetal acceleration limiting criterion, and may use the correction value 370 to perform an operation (e.g., scaling) on the first linear velocity parameter 341 and the first angular velocity parameter 342, respectively, thereby calculating a second linear velocity parameter 343 and a second angular velocity parameter 344.

Further, the correction parameter calculation unit 210 may input the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter and a third angular velocity parameter. The second limit model according to one embodiment of the invention may allow a linear velocity limiting criterion to be dynamically specified on the basis of a linear velocity, and, for example, may be dynamically determined such that the linear velocity and the limiting criterion thereof have a staircase relationship or proportional relationship (e.g., a relationship corresponding to a staircase graph or proportional graph in which the linear velocity is shown on the horizontal axis and the limiting criterion is shown on the vertical axis). The third limit model according to one embodiment of the invention may allow an angular velocity limiting criterion to be dynamically specified on the basis of an angular velocity, and, for example, may be dynamically determined such that the angular velocity and the limiting criterion thereof have a staircase relationship or proportional relationship (e.g., a relationship corresponding to a staircase graph or proportional graph in which the angular velocity is shown on the horizontal axis and the limiting criterion is shown on the vertical axis).

For example, the correction parameter calculation unit 210 may correct the second angular velocity parameter using a difference calculated by comparing the second linear velocity parameter with a linear velocity limiting criterion specified from the second limit model, thereby calculating the third angular velocity parameter, and may correct the second linear velocity parameter to be limited to the linear velocity limiting criterion specified from the second limit model, when the second linear velocity parameter is greater than the linear velocity limiting criterion. Further, the correction parameter calculation unit 210 may correct the second linear velocity parameter using a difference calculated by comparing the second angular velocity parameter with an angular velocity limiting criterion specified from the third limit model, thereby calculating the third linear velocity parameter, and may correct the second angular velocity parameter to be limited to the angular velocity limiting criterion specified from the third limit model, when the second angular velocity parameter is greater than the angular velocity limiting criterion.

As another example, when the second linear velocity parameter and the second angular velocity parameter are inputted into the second limit model as input parameters, and output parameters outputted from the second limit model are inputted into the third limit model as input parameters, the correction parameter calculation unit 210 may correct the second angular velocity parameter using a difference calculated by comparing the second linear velocity parameter with a linear velocity limiting criterion specified from the second limit model, thereby calculating the third angular velocity parameter, and may correct the second linear velocity parameter to be limited to the linear velocity limiting criterion specified from the second limit model, when the second linear velocity parameter is greater than the linear velocity limiting criterion. Next, the correction parameter calculation unit 210 may correct the second linear velocity parameter (or the second linear velocity parameter corrected to be limited as above) using a difference calculated by comparing the third angular velocity parameter with an angular velocity limiting criterion specified from the third limit model, thereby calculating the third linear velocity parameter, and may correct the third angular velocity parameter to be limited to the angular velocity limiting criterion specified from the third limit model, when the third angular velocity parameter is greater than the angular velocity limiting criterion.

As yet another example, when the second linear velocity parameter and the second angular velocity parameter are inputted into the third limit model as input parameters, and output parameters outputted from the third limit model are inputted into the second limit model as input parameters, the correction parameter calculation unit 210 may correct the second linear velocity parameter using a difference calculated by comparing the second angular velocity parameter with an angular velocity limiting criterion specified from the third limit model, thereby calculating the third linear velocity parameter, and may correct the second angular velocity parameter to be limited to the angular velocity limiting criterion specified from the third limit model, when the second angular velocity parameter is greater than the angular velocity limiting criterion. Next, the correction parameter calculation unit 210 may correct the second angular velocity parameter (or the second angular velocity parameter corrected to be limited as above) using a difference calculated by comparing the third linear velocity parameter with a linear velocity limiting criterion specified from the second limit model, thereby calculating the third angular velocity parameter, and may correct the third linear velocity parameter to be limited to the linear velocity limiting criterion specified from the second limit model, when the third linear velocity parameter is greater than the linear velocity limiting criterion.

Figure 4:
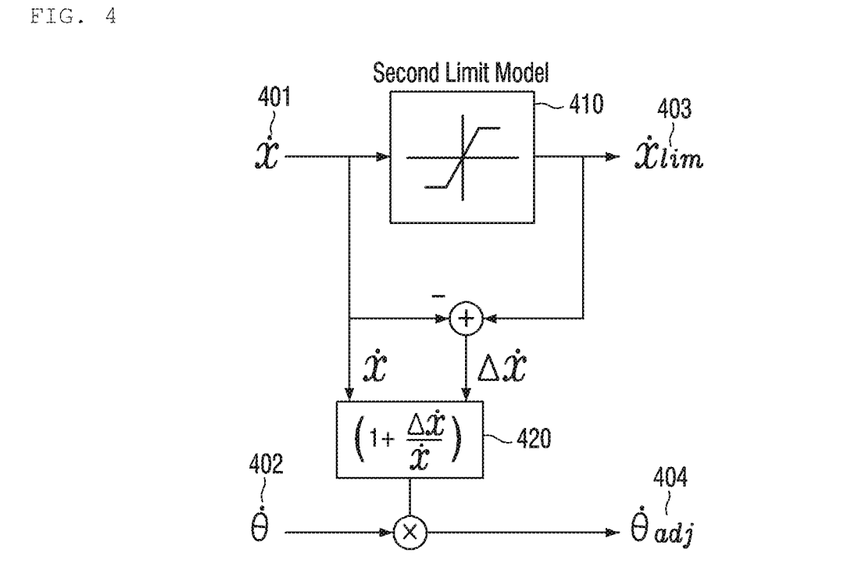
FIG. 4 illustratively shows a process of controlling movement of a robot according to one embodiment of the invention.
Figure 5:
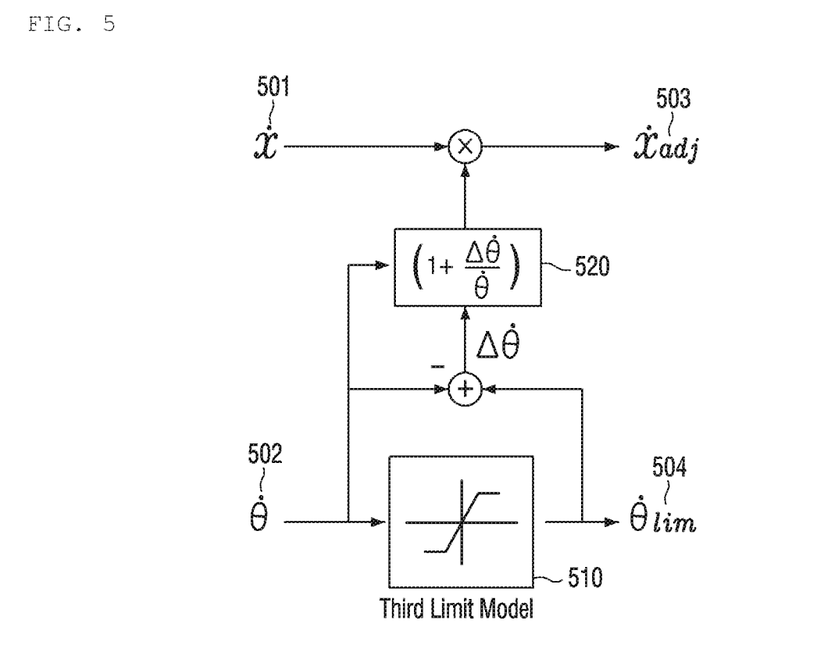
FIG. 5 illustratively shows a process of controlling movement of a robot according to one embodiment of the invention.

More specifically, referring to FIG. 4, the correction parameter calculation unit 210 may calculate a correction value 420 on the basis of a difference calculated by comparing a second linear velocity parameter 401 with a linear velocity limiting criterion specified from a second limit model 410, and use the correction value 420 to perform an operation (e.g., scaling) on a second angular velocity parameter 402, thereby calculating a third angular velocity parameter 404, and may correct the second linear velocity parameter 401 to be limited to the linear velocity limiting criterion specified from the second limit model 410 (as shown as 403), when the second linear velocity parameter 401 is greater than the linear velocity limiting criterion. Further, referring to FIG. 5, the correction parameter calculation unit 210 may calculate a correction value 520 on the basis of a difference calculated by comparing a second angular velocity parameter 502 with an angular velocity limiting criterion specified from a third limit model 510, and use the correction value 520 to perform an operation (e.g., scaling) on a second linear velocity parameter 501, thereby calculating a third linear velocity parameter 503, and may correct the second angular velocity parameter 502 to be limited to the angular velocity limiting criterion specified from the third limit model 510 (as shown as 504), when the second angular velocity parameter 502 is greater than the angular velocity limiting criterion.

Meanwhile, the first limit model, the second limit model, and the third limit model according to the invention may be dynamically determined on the basis of context information, location information, and the like of the robot 300, and may be specified by performing artificial intelligence (AI) training including machine learning or deep learning.

Next, the robot movement management unit 220 may control the movement of the robot 300 on the basis of the third linear velocity parameter and the third angular velocity parameter calculated by the correction parameter calculation unit 210.

For example, the robot movement management unit 220 may control the movement of the robot 300 such that a linear velocity and an angular velocity of the robot 300 may be limited to the linear velocity and the angular velocity specified on the basis of the third linear velocity parameter and the third angular velocity parameter.

Figure 6:
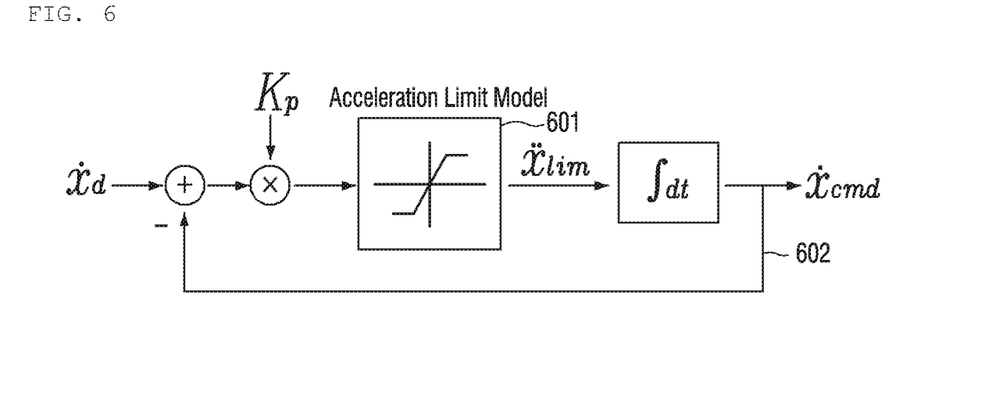
FIG. 6 illustratively shows a process of controlling movement of a robot according to one embodiment of the invention.

More specifically, referring to FIG. 6, the robot movement management unit 220 may control the movement of the robot 300 using a hard limiter 601 and a feedback control loop 602 configured to limit an acceleration of the robot 300 such that a linear velocity and an angular velocity of the robot 300 may be limited to the linear velocity and the angular velocity specified on the basis of the third linear velocity parameter and the third angular velocity parameter. For example, the robot movement management unit 220 may control the movement of the robot 300 by adjusting a velocity of the robot 300 using the hard limiter 601, and providing feedback on the adjusted velocity using the feedback control loop 602.

Next, according to one embodiment of the invention, the communication unit 230 may function to enable data transmission/reception from/to the correction parameter calculation unit 210 and the robot movement management unit 220.

Lastly, according to one embodiment of the invention, the control unit 240 may function to control data flow among the correction parameter calculation unit 210, the robot movement management unit 220, and the communication unit 230. That is, the control unit 240 according to the invention may control data flow into/out of the robot movement control system 200 or data flow among the respective components of the robot movement control system 200, such that the correction parameter calculation unit 210, the robot movement management unit 220, and the communication unit 230 may carry out their particular functions, respectively.

Figure 7:
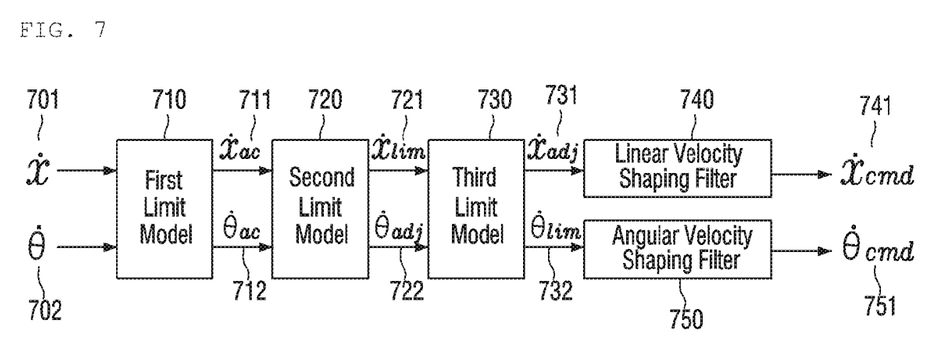
FIG. 7 illustratively shows a process of controlling movement of a robot according to one embodiment of the invention.

FIG. 7 illustratively shows a process of controlling the movement of the robot 300 according to one embodiment of the invention.

Referring to FIG. 7, it may be assumed that a first linear velocity parameter 701 and a first angular velocity parameter 702 specified as the robot 300 moves are inputted into a first limit model 710 for limiting a centripetal acceleration as input parameters, and output parameters 711 and 712 outputted from the first limit model 710 are inputted into a second limit model 720 as input parameters, and then output parameters 721 and 722 outputted from the second limit model 720 are inputted into a third limit model 730 as input parameters.

First, a second linear velocity parameter 711 and a second angular velocity parameter 712 may be calculated by inputting the first linear velocity parameter 701 and the first angular velocity parameter 702, which are specified as the robot 300 moves, into the first limit model 710 to correct the first linear velocity parameter 701 and the first angular velocity parameter 702.

Next, a third angular velocity parameter 722 may be calculated by correcting the second angular velocity parameter 712 using a difference calculated by comparing the second linear velocity parameter 721 with a linear velocity limiting criterion specified from the second limit model 720, and a second linear velocity parameter 721 may be calculated by correcting the second linear velocity parameter 711 to be limited to the linear velocity limiting criterion specified from the second limit model 720, when the second linear velocity parameter 711 is greater than the linear velocity limiting criterion.

Next, a third linear velocity parameter 731 may be calculated by correcting the second linear velocity parameter 721 using a difference calculated by comparing the third angular velocity parameter 722 with an angular velocity limiting criterion specified from the third limit model 730, and a third angular velocity parameter 732 may be calculated by correcting the third angular velocity parameter 722 to be limited to the angular velocity limiting criterion specified from the third limit model 730, when the third angular velocity parameter 722 is greater than the angular velocity limiting criterion.

Next, the movement of the robot 300 may be controlled by adjusting a linear velocity and an angular velocity of the robot 300 to be limited to the linear velocity specified on the basis of the third linear velocity parameter 731 and the angular velocity specified on the basis of the third angular velocity parameter 732, respectively (as shown as 741 and 751). A linear velocity shaping filter 740 and an angular velocity shaping filter 750 may be employed to adjust the linear velocity and the angular velocity of the robot 300 as above, respectively.

Figure 8:
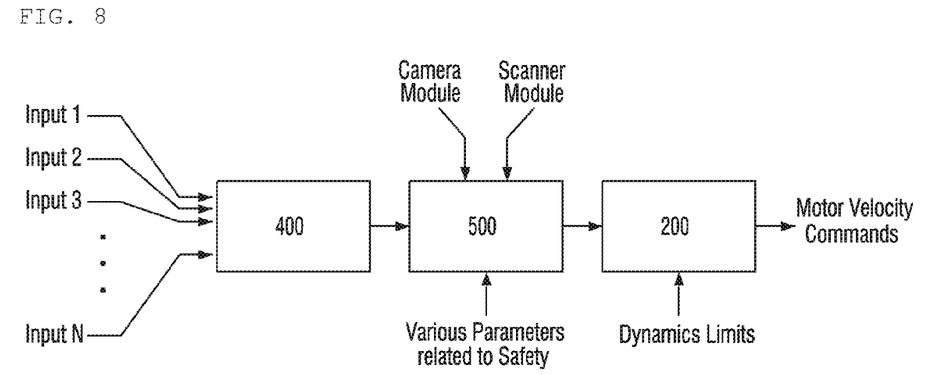
FIG. 8 illustratively shows a process of controlling movement of a robot according to one embodiment of the invention.

FIG. 8 illustratively shows another process of controlling the movement of the robot 300 according to one embodiment of the invention.

Referring to FIG. 8, a situation is shown in which the robot movement control system 200 interworks with a control command processing system 400 and a safety control system 500 to control the movement of the robot 300 according to one embodiment of the invention.

The control command processing system 400 according to one embodiment of the invention may communicate with the robot movement control system 200, the robot 300, and the safety control system 500 via the communication network 100, and may function to process (e.g., activate or deactivate) a plurality of control commands inputted to the robot 300, with reference to a timeout duration and a priority of each of the plurality of control commands. For example, the control command processing system 400 may determine a control command activation priority on the basis of a plurality of control commands that are associated with the movement of the robot 300 and inputted through a plurality of channels, and may activate a control command whose priority is equal to or higher than the determined priority, and deactivate or ignore a control command whose priority is lower than the priority of the control command to be activated. Further, when a control command whose priority is higher than the priority of the currently activated control command is inputted, the control command processing system 400 may allow the inputted control command to be activated first. In addition, when the timeout duration of the activated control command has elapsed, the control command processing system 400 may lower the priority of the control command (or set the priority to "empty") or deactivate the control command so that other control commands may be activated. Meanwhile, the control command processing system 400 may include a timer (e.g., a countdown watchdog timer) to determine whether a timeout duration has elapsed for a control command.

Further, the safety control system 500 according to one embodiment of the invention may communicate with the robot movement control system 200, the robot 300, and the control command processing system 400 via the communication network 100, and may function to detect collision of the robot 300 and generate a stop command for the robot 300. For example, when an obstacle is detected on a route of the robot 300 on the basis of an imaging module (e.g., a 3D camera) or a scanner module (e.g., a LIDAR sensor) of the robot 300, the safety control system 500 may use a velocity (e.g., a linear velocity) of the robot 300 and a maximum deceleration limit of the robot 300 (e.g., which may be specified on the basis of braking ability of the robot 300 and friction characteristics of the place) to calculate a safety stopping distance (e.g., which is a sum of a predetermined buffer distance and a braking distance specified on the basis of the linear velocity and the maximum deceleration limit of the robot 300), and generate a stop command with reference to the safe stopping distance and a distance between the robot 300 and the obstacle. For example, the stop command may be intended to prevent a payload object (e.g., food) of the robot 300 from spilling, and to gradually decelerate the robot 300 so that the robot 300 may stop before colliding with the obstacle. Meanwhile, when the distance between the robot 300 and the obstacle becomes smaller than the safety stopping distance of the robot 300, the safety control system 500 may generate an emergency stop command so that the velocity of the robot 300 becomes zero.

Meanwhile, although the control command processing system 400 and the safety control system 500 have been described as above, the above description is illustrative, and it will be apparent to those skilled in the art that at least a part of the functions or components required for the control command processing system 400 and the safety control system 500 may be implemented in the robot movement control system 200 (e.g., in this case, such a component may be referred to as a control command processing unit or a safety control unit of the robot movement control system 200) or configured as a separate system, as necessary.

Another process of controlling the movement of the robot 300 according to one embodiment of the invention will be discussed in detail. First, a plurality of control commands associated with a velocity are inputted to the robot 300, and the plurality of control commands may be processed with reference to a timeout duration and a priority of each of the control commands.

In this case, when an obstacle is detected on a route of the robot 300 on the basis of an imaging module (e.g., a 3D camera) or a scanner module (e.g., a LIDAR sensor) of the robot 300, a safety stopping distance may be calculated on the basis of a velocity (e.g., a linear velocity and an angular velocity) and a maximum deceleration limit of the robot 300, and a stop command may be generated with reference to the safe stopping distance and a distance between the robot 300 and the obstacle. The stop command may be set to have the highest priority among the plurality of control commands.

Next, a second linear velocity parameter and a second angular velocity parameter may be calculated by inputting a first linear velocity parameter and a first angular velocity parameter, which are specified as the robot 300 moves, into a first limit model for limiting a centripetal acceleration to correct the first linear velocity parameter and the first angular velocity parameter. A third linear velocity parameter and a third angular velocity parameter may be calculated by inputting the second linear velocity parameter and the second angular velocity parameter into at least one of a second limit model for limiting a linear velocity and a third limit model for limiting an angular velocity to correct the second linear velocity parameter and the second angular velocity parameter. The robot 300 may be decelerated on the basis of the third linear velocity parameter and the third angular velocity parameter. In this case, the velocity of the robot 300 may be gradually reduced by repeatedly performing the process of calculating the third linear velocity parameter and the third angular velocity parameter from the first linear velocity parameter and the first angular velocity parameter specified as the robot 300 moves, and decelerating the robot 300 on the basis of the third linear velocity parameter and the third angular velocity parameter, so as to prevent a payload object of the robot 300 from spilling and allow the robot 300 to safely and smoothly stop before colliding with the obstacle.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 9:
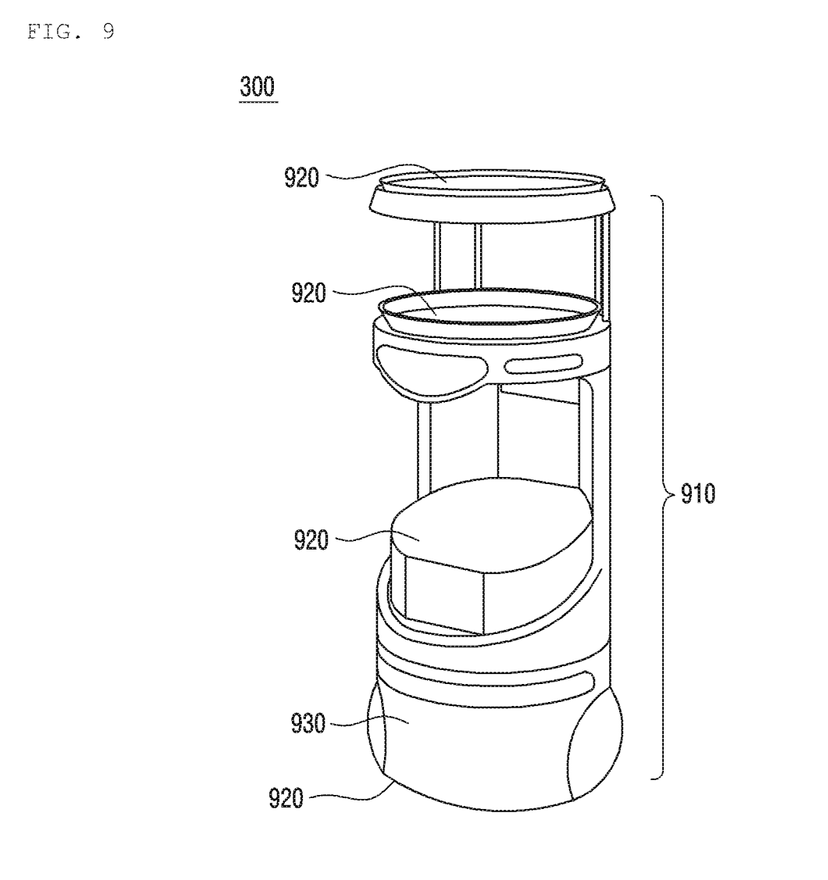
FIG. 9 illustratively shows the structure of a robot according to one embodiment of the invention.

Referring to FIG. 9, the robot 300 may comprise a main body 910, a drive unit 920, and a processor 930.

For example, the main body 910 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 10:
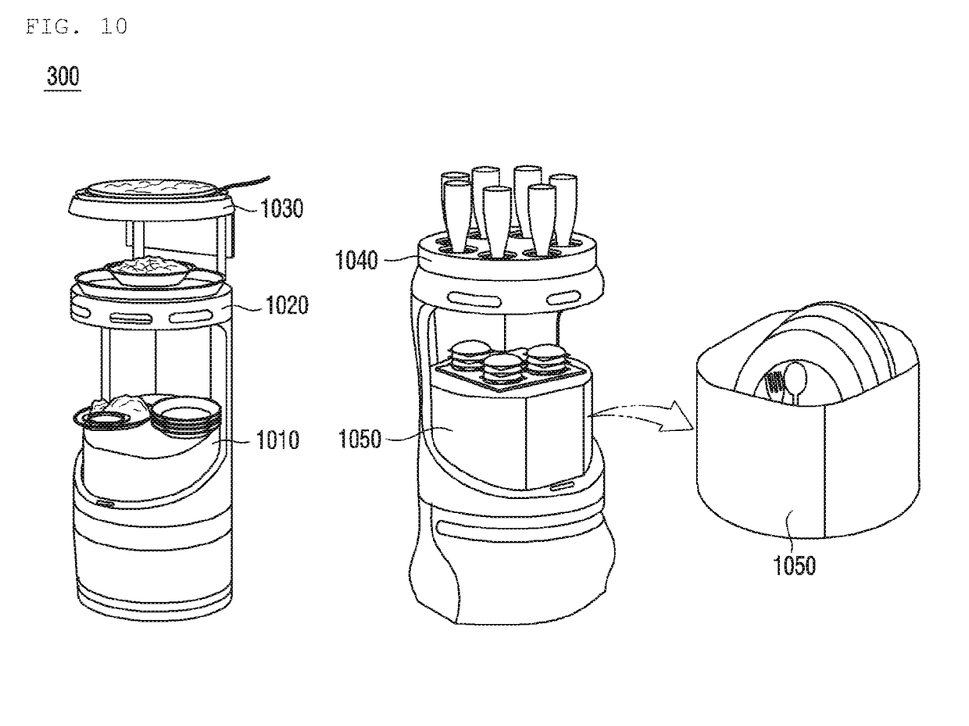
FIG. 10 illustratively shows the structure of a robot according to one embodiment of the invention.

Referring to FIG. 10, when the robot 300 is a serving robot, it may include a first space 1010 and a second space 1020 for providing the transported object and collecting the retrieved object. Further, the robot 300 may further include a third space 1030 that is an expansion space provided via a removable pillar, and more loading spaces may be provided by adding more expansion spaces as needed. Further, the robot 300 may further include a tray 1040 dedicated for the transported or retrieved object. For example, the tray 1040 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 1010 of the robot 300 may include a fourth space 1050 that may be taken out through a lateral side of the robot 300. The fourth space 1050 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, the main body 910 may further include an imaging module (e.g., a visible light camera, an infrared camera, etc.) (not shown) and a scanner module (e.g., a LIDAR sensor) for acquiring images of surroundings and information on obstacles.

Next, the drive unit 920 according to one embodiment of the invention may comprise a module for moving the main body 910 to other locations or a module for loading and unloading the transported and retrieved objects.

For example, the drive unit 920 may include a module related to electrically, mechanically, or hydraulically driven wheels, propellers, or the like as the module for moving the main body 910 to other locations, and may include a robotic arm module for mounting and conveying the transported and retrieved objects as the module for loading and unloading the transported and retrieved objects.

Next, the processor 930 according to one embodiment of the invention may be electrically connected to the drive unit 920 to perform a function of controlling the drive unit 920 (and may include a communication module for communicating with an external system). For example, the processor 930 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 930 may include the functions of at least one of the correction parameter calculation unit 210 and the robot movement management unit 220 of the robot movement control system 200 according to the invention (e.g., the corresponding functions may be modularized and included in the processor 930), and may function to control the drive unit 920 through communication with an external system (not shown) that includes the functions of at least one of the correction parameter calculation unit 210 and the robot movement management unit 220 of the robot movement control system 200.

Specifically, the processor 930 may function to: input a first linear velocity parameter and a first angular velocity parameter, which are specified as the robot 300 moves, into a first limit model for limiting a centripetal acceleration to correct the first linear velocity parameter and the first angular velocity parameter, thereby calculating a second linear velocity parameter and a second angular velocity parameter; input the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter and a third angular velocity parameter; and control the movement of the robot 300 on the basis of the third linear velocity parameter and the third angular velocity parameter.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling movement of a robot, the method comprising the steps of:
    (a) inputting a first linear velocity parameter and a first angular velocity parameter, which are specified as the robot moves, into a first limit model for limiting a centripetal acceleration to correct the first linear velocity parameter and the first angular velocity parameter, thereby calculating a second linear velocity parameter and a second angular velocity parameter;
    (b) inputting the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter as a linear velocity limit and a third angular velocity parameter as an angular velocity limit; and
    (c) controlling the movement of the robot on the basis of a comparison between an actual linear velocity of the robot and the third linear velocity parameter and a comparison between an actual angular velocity of the robot and the third angular velocity parameter,
    wherein the first limit model, the second limit model, and the third limit model are serially connected, and
    wherein the second linear velocity parameter and the second angular velocity parameter outputted from the first limit model are inputted into the second limit model as input parameters, and output parameters outputted from the second limit model are inputted into the third limit model as input parameters.

2. The method of claim 1, wherein the step (a) comprises the steps of:
    calculating a first centripetal acceleration on the basis of the first linear velocity parameter and the first angular velocity parameter; and
    correcting the first linear velocity parameter and the first angular velocity parameter, respectively, using a difference calculated by comparing the first centripetal acceleration with a centripetal acceleration limiting criterion specified from the first limit model, thereby calculating the second linear velocity parameter and the second angular velocity parameter.

3. The method of claim 1, wherein the step (b) comprises the steps of:
    correcting the second angular velocity parameter using a difference calculated by comparing the second linear velocity parameter with a linear velocity limiting criterion specified from the second limit model, thereby calculating the third angular velocity parameter, and correcting the second linear velocity parameter to be limited to the linear velocity limiting criterion, when the second linear velocity parameter is greater than the linear velocity limiting criterion; and
    correcting the second linear velocity parameter, or the second linear velocity parameter corrected to be limited to the linear velocity limiting criterion, using a difference calculated by comparing the third angular velocity parameter with an angular velocity limiting criterion specified from the third limit model, thereby calculating the third linear velocity parameter, and correcting the third angular velocity parameter to be limited to the angular velocity limiting criterion, when the third angular velocity parameter is greater than the angular velocity limiting criterion.

4. The method of claim 1, wherein the step (b) comprises the steps of:
    correcting the second linear velocity parameter using a difference calculated by comparing the second angular velocity parameter with an angular velocity limiting criterion specified from the third limit model, thereby calculating the third linear velocity parameter, and correcting the second angular velocity parameter to be limited to the angular velocity limiting criterion, when the second angular velocity parameter is greater than the angular velocity limiting criterion; and
    correcting the second angular velocity parameter, or the second angular velocity parameter corrected to be limited to the angular velocity limiting criterion, using a difference calculated by comparing the third linear velocity parameter with a linear velocity limiting criterion specified from the second limit model, thereby calculating the third angular velocity parameter, and correcting the third linear velocity parameter to be limited to the linear velocity limiting criterion, when the third linear velocity parameter is greater than the linear velocity limiting criterion.

5. The method of claim 1, wherein in the step (c), the movement of the robot is controlled using a feedback control loop for providing feedback on a velocity of the robot.

6. A non-transitory computer-readable recording medium having stored thereon a computer program for executing a method of for controlling movement of a robot, the method comprising the steps of:
    (a) inputting a first linear velocity parameter and a first angular velocity parameter, which are specified as the robot moves, into a first limit model for limiting a centripetal acceleration to correct the first linear velocity parameter and the first angular velocity parameter, thereby calculating a second linear velocity parameter and a second angular velocity parameter;
    (b) inputting the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter as a linear velocity limit and a third angular velocity parameter as an angular velocity limit; and
    (c) controlling the movement of the robot on the basis of a comparison between an actual linear velocity of the robot and the third linear velocity parameter and a comparison between an actual angular velocity of the robot and the third angular velocity parameter,
    wherein the first limit model, the second limit model, and the third limit model are serially connected, and
    wherein the second linear velocity parameter and the second angular velocity parameter outputted from the first limit model are inputted into the second limit model as input parameters, and output parameters outputted from the second limit model are inputted into the third limit model as input parameters.

7. A system for controlling movement of a robot, the system comprising:
a correction parameter calculation unit configured to input a first linear velocity parameter and a first angular velocity parameter, which are specified as the robot moves, into a first limit model for limiting a centripetal acceleration to correct the first linear velocity parameter and the first angular velocity parameter, thereby calculating a second linear velocity parameter and a second angular velocity parameter, and to input the second linear velocity parameter and the second angular velocity parameter into at least one of a second limit model for limiting a linear velocity and a third limit model for limiting an angular velocity to correct the second linear velocity parameter and the second angular velocity parameter, thereby calculating a third linear velocity parameter as a linear velocity limit and a third angular velocity parameter as an angular velocity limit; and
a robot movement management unit configured to control the movement of the robot on the basis of a comparison between an actual linear velocity of the robot and the third linear velocity parameter and a comparison between an actual angular velocity of the robot and the third angular velocity parameter,
wherein the first limit model, the second limit model, and the third limit model are serially connected, and
wherein the second linear velocity parameter and the second angular velocity parameter outputted from the first limit model are inputted into the second limit model as input parameters, and output parameters outputted from the second limit model are inputted into the third limit model as input parameters.

8. The system of claim 7, wherein the correction parameter calculation unit is configured to:
calculate a first centripetal acceleration on the basis of the first linear velocity parameter and the first angular velocity parameter; and
correct the first linear velocity parameter and the first angular velocity parameter, respectively, using a difference calculated by comparing the first centripetal acceleration with a centripetal acceleration limiting criterion specified from the first limit model, thereby calculating the second linear velocity parameter and the second angular velocity parameter.

9. The system of claim 7, wherein the correction parameter calculation unit is configured to:
correct the second angular velocity parameter using a difference calculated by comparing the second linear velocity parameter with a linear velocity limiting criterion specified from the second limit model, thereby calculating the third angular velocity parameter, and correct the second linear velocity parameter to be limited to the linear velocity limiting criterion, when the second linear velocity parameter is greater than the linear velocity limiting criterion; and
correct the second linear velocity parameter, or the second linear velocity parameter corrected to be limited to the linear velocity limiting criterion, using a difference calculated by comparing the third angular velocity parameter with an angular velocity limiting criterion specified from the third limit model, thereby calculating the third linear velocity parameter, and correct the third angular velocity parameter to be limited to the angular velocity limiting criterion, when the third angular velocity parameter is greater than the angular velocity limiting criterion.

10. The system of claim 7, wherein the correction parameter calculation unit is configured to:
correct the second linear velocity parameter using a difference calculated by comparing the second angular velocity parameter with an angular velocity limiting criterion specified from the third limit model, thereby calculating the third linear velocity parameter, and correct the second angular velocity parameter to be limited to the angular velocity limiting criterion, when the second angular velocity parameter is greater than the angular velocity limiting criterion; and
correct the second angular velocity parameter, or the second angular velocity parameter corrected to be limited to the angular velocity limiting criterion, using a difference calculated by comparing the third linear velocity parameter with a linear velocity limiting criterion specified from the second limit model, thereby calculating the third angular velocity parameter, and correct the third linear velocity parameter to be limited to the linear velocity limiting criterion, when the third linear velocity parameter is greater than the linear velocity limiting criterion.

11. The system of claim 7, wherein the robot movement management unit is configured to control the movement of the robot using a feedback control loop for providing feedback on a velocity of the robot.

* * * * *